United States Patent
Ryon

(10) Patent No.: US 10,288,292 B2
(45) Date of Patent: May 14, 2019

(54) SWIRLERS

(71) Applicant: Delavan Inc, West Des Moines, IA (US)

(72) Inventor: Jason A. Ryon, Carlisle, IA (US)

(73) Assignee: Delavan Inc, West Des Moines, IA (US)

( * ) Notice: Subject to any disclaimer, the term of this patent is extended or adjusted under 35 U.S.C. 154(b) by 111 days.

(21) Appl. No.: 14/996,510

(22) Filed: Jan. 15, 2016

(65) Prior Publication Data

US 2017/0205070 A1 Jul. 20, 2017

(51) Int. Cl.
*F23R 3/28* (2006.01)
*F02C 7/22* (2006.01)
*B05B 7/10* (2006.01)

(52) U.S. Cl.
CPC ............ *F23R 3/286* (2013.01); *F02C 7/222* (2013.01); *B05B 7/10* (2013.01); *F05D 2220/32* (2013.01)

(58) Field of Classification Search
CPC ...... F23R 3/286; F02C 7/222; F05D 2220/32; B05B 7/10
USPC .................................. 239/461–524
See application file for complete search history.

(56) References Cited

U.S. PATENT DOCUMENTS

| | | | |
|---|---|---|---|
| 4,614,440 A | 9/1986 | King | |
| 4,848,920 A * | 7/1989 | Heathe | B01F 5/064 366/339 |
| 5,636,981 A * | 6/1997 | Lilly | F23D 11/102 239/427 |
| 8,348,180 B2 | 1/2013 | Mao et al. | |
| 2005/0279862 A1* | 12/2005 | Mao | F23D 11/107 239/403 |
| 2013/0256432 A1* | 10/2013 | Wilson | F23R 3/28 239/600 |

FOREIGN PATENT DOCUMENTS

| | | |
|---|---|---|
| JP | S5843228 A | 3/1983 |
| WO | WO-2009/125451 A1 | 10/2009 |
| WO | WO-2015/171997 A1 | 11/2015 |

OTHER PUBLICATIONS

Translation of JP5843228 A.*
United Kingdom Search Report dated Jul. 3, 2017 issued during the prosecution of corresponding United Kingdom Patent Application No. GB 1700307.0 (3 pages).

* cited by examiner

*Primary Examiner* — Darren W Gorman
*Assistant Examiner* — Qingzhang Zhou
(74) *Attorney, Agent, or Firm* — Locke Lord LLP; Scott D. Wofsy; Joshua L. Jones

(57) ABSTRACT

A swirler includes a swirler body defining a longitudinal axis. A stack of swirler plates is assembled to the swirler body stacked in a direction along the longitudinal axis. Each of the swirl plates defines a vane portion. The swirler plates are mounted rotated circumferentially about the longitudinal axis relative to neighboring ones of the swirler plates so the vane portions form a swirler vane.

6 Claims, 8 Drawing Sheets

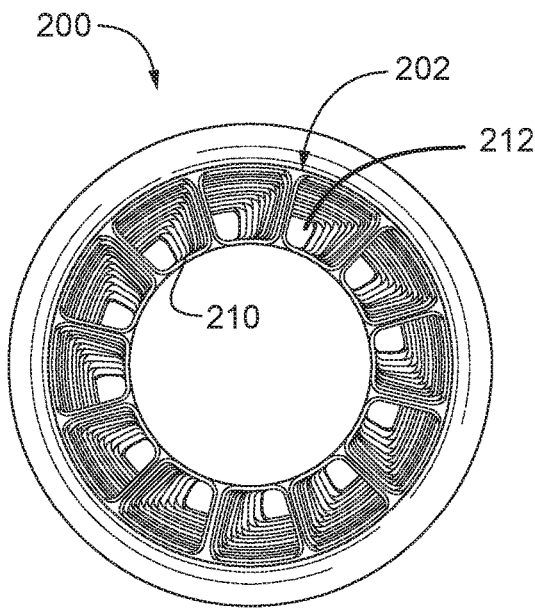
FIG. 6
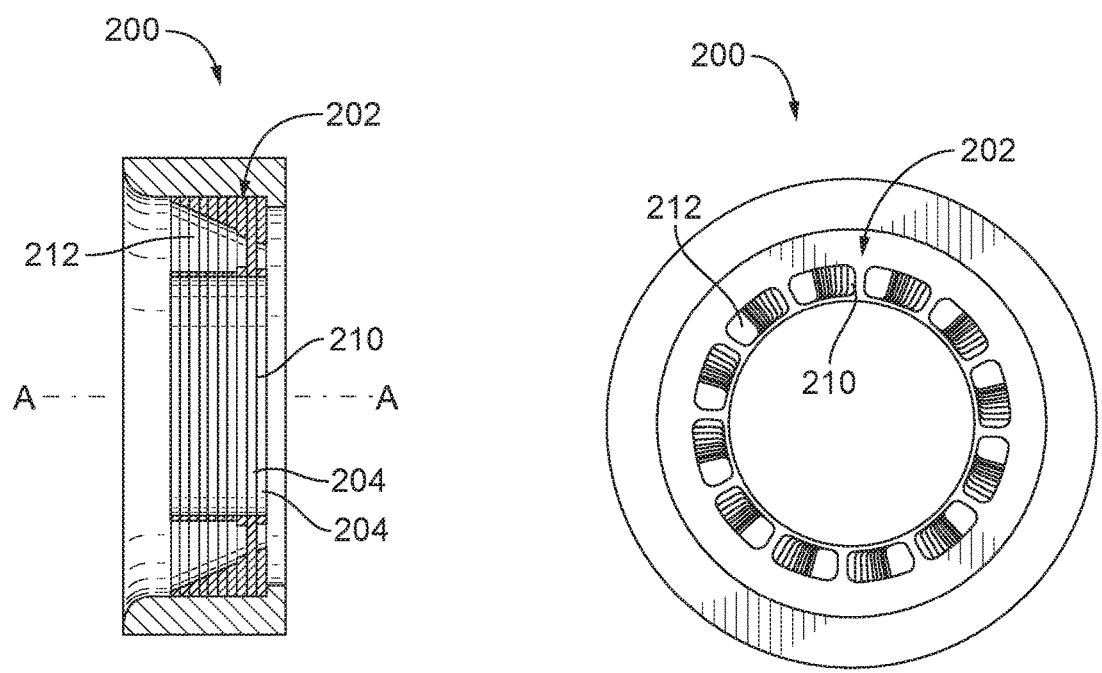
FIG. 7
FIG. 8

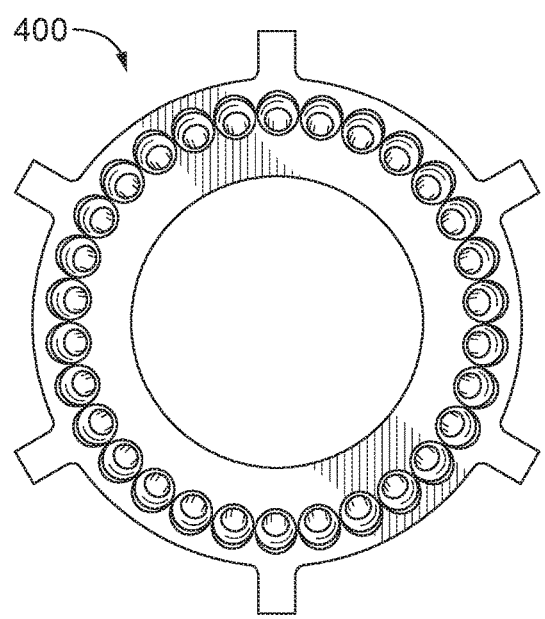
FIG. 11
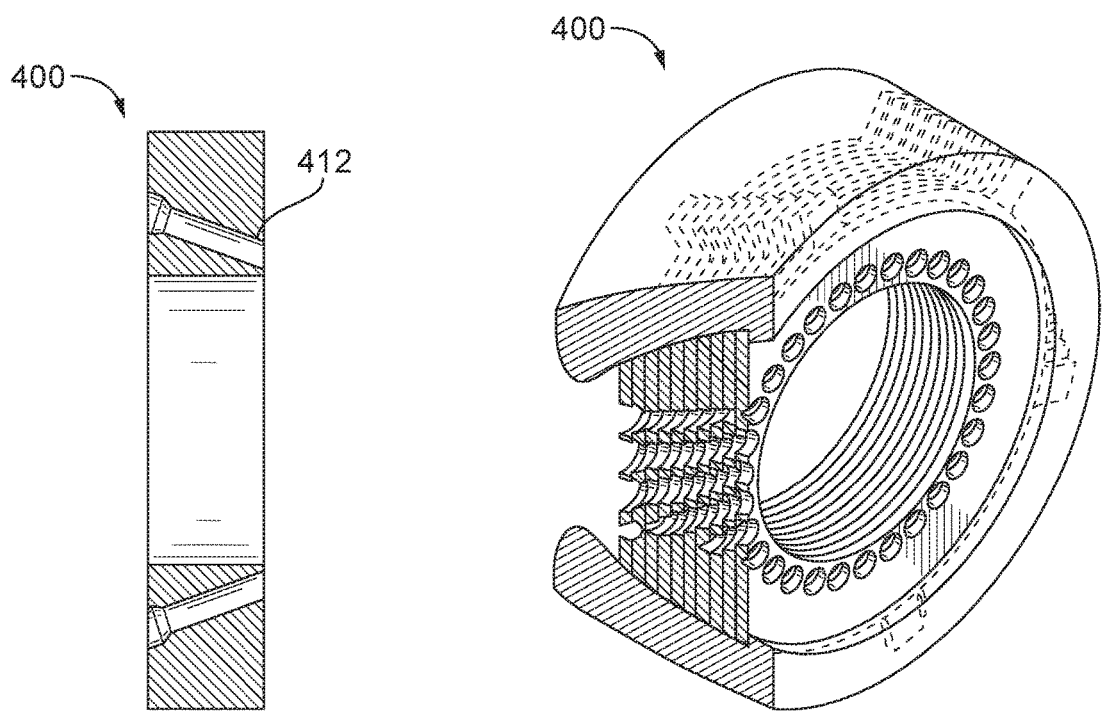
FIG. 12
FIG. 13

SWIRLERS

BACKGROUND OF THE INVENTION

1. Field of the Invention

The present disclosure relates to swirlers for inducing swirl on flowing fluids, and more particularly to swirlers for air or other fluids such as used in atomizers, fuel injectors for gas turbine engines, and the like.

2. Description of Related Art

A variety of devices and methods are known in the art for swirling fluids such as air. Swirlers in air and fuel flow passages can be used in fuel injection, for example, where the swirl induced on the fuel and air atomizes the fuel for combustion. Air swirlers for gas turbine engines are required to be designed for efficiency, and for manufacturability. The designs must also be tolerant of a high degree of thermally induced stresses.

Conventional methods and systems have generally been considered satisfactory for their intended purpose. However, there is still a need in the art for improved swirlers. The present disclosure provides a solution for this need.

SUMMARY OF THE INVENTION

A swirler includes a swirler body defining a longitudinal axis. A stack of swirler plates is assembled to the swirler body stacked in a direction along the longitudinal axis. Each of the swirl plates defines a vane portion. The swirler plates are mounted rotated circumferentially about the longitudinal axis relative to neighboring ones of the swirler plates so the vane portions form a swirler vane.

The swirler body can defines an annular flow passage therethrough. The stack of swirler plates can be mounted within the annular flow passage to impart swirl on fluids flowing through the annular flow passage.

Each of the swirler plates can include a plurality of vane portions, wherein respective vane portions of the swirler plates form a plurality of respective swirler vanes. Each of the swirler plates can include a peripheral ring, wherein the vane portions of the swirler plates extend radially inward from the respective peripheral rings. Each swirler plate can include at least one alignment tongue engaged with an alignment grove defined in the swirler body for registration of the swirler plates to form the swirler vane. The alignment tongue of each swirler plate can be positioned circumferentially relative to the respective vane portion in a circumferential location common to all of the swirler plates, wherein the alignment grove of the swirler body is profiled to define the swirler vane by registration of the alignment tongues with the alignment groove.

The swirler plates can be identical to one another. An end swirler plate can be included at one end of the stack of swirler plates, wherein the end swirler plate includes a swirl vane portion positioned to form part of the swirl vane, wherein the end swirler plate differs from the swirler plates of the stack of swirler plates in at least one of material or axial thickness. It is also contemplated that each swirler plate defines a swirl passage therethrough, and wherein the swirl passage of each successive swirler plate has a reduced size relative to that of a preceding one of the swirler plates in the direction along the longitudinal axis to define a converging swirl flow path through the stack of swirler plates.

A nozzle includes a nozzle body including a swirler as in any of the embodiments described above, wherein the swirler defines an air circuit, and wherein the nozzle body defines a liquid circuit, and wherein the liquid and air circuits are configured for air blast atomization of a spray issued form the liquid circuit. The air circuit can be an inner air circuit inboard of the liquid circuit or an outer air circuit outboard of the liquid circuit, for example.

A method of making a swirler includes engaging a stack of swirler plates with a swirler body defining a longitudinal axis with each swirler plate rotated circumferentially about the longitudinal axis relative to neighboring ones of the swirler plates so vane portions of the swirler plates form one or more swirler vanes. The method can include forming the stack of swirler plates with the plates stacked using at least one of electrical discharge machining, water jet machining, conventional cutting (e.g., machining), sheet metal processing (e.g., stamping/cutting/punching), laser cutting, metal injection molding (MIM), additive manufacturing or regular sintering, and/or etching to form one or more flow passages through the stack. Engaging the stack of swirler plates can include sliding the stack of swirler plates into engagement with an alignment groove of the swirler body followed by joining of one or more of the swirler plates to the swirler body to secure the stack of swirler plates to the swirler body. It is also contemplated that the assembly can be done without a tongue/groove structure. This can be done, for example, by aligning the stacked swirler through assembly fixturing, and then joining the swirler together, e.g., through braze. Then the assembly fixture can then be removed.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIGS. 6-8 are inlet end elevation, cross-sectional side elevation, and outlet end elevation views, respectively, of another exemplary embodiment of a swirler in accordance with this disclosure, showing a stack of swirler plates where the swirl passages are narrower and narrower from plate to plate to form converging swirl passages;

FIGS. 11-13 are inlet end elevation, cross-sectional side, and cut-away perspective views, respectively, of another exemplary embodiment of a stack of swirler plates in accordance with this disclosure, showing cylindrical flow passages with enlarged inlet openings;

FIGS. 14-15 are a perspective and cross-sectional perspective views, respectively, of another exemplary embodiment of a stack of swirler plates in accordance with this disclosure, showing a stack with a central, cylindrical body, and peripheral rings that can serve as a heat shield or the like;

DETAILED DESCRIPTION OF THE
PREFERRED EMBODIMENTS

Figure 1:
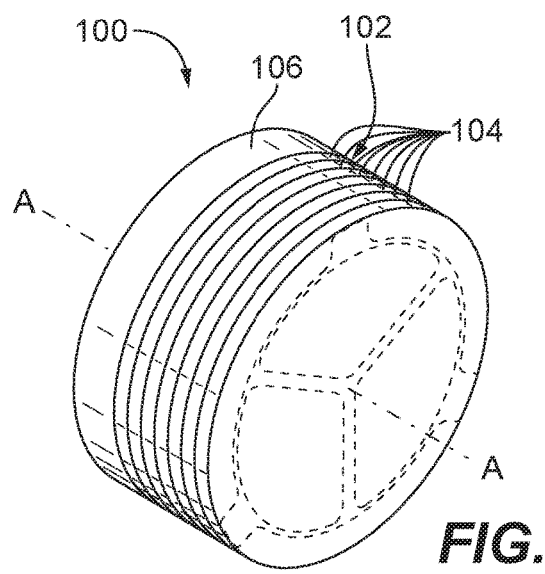
FIG. 1 is a perspective view of an exemplary embodiment of a stack of swirler plate blanks constructed in accordance with the present disclosure.
Figure 2:
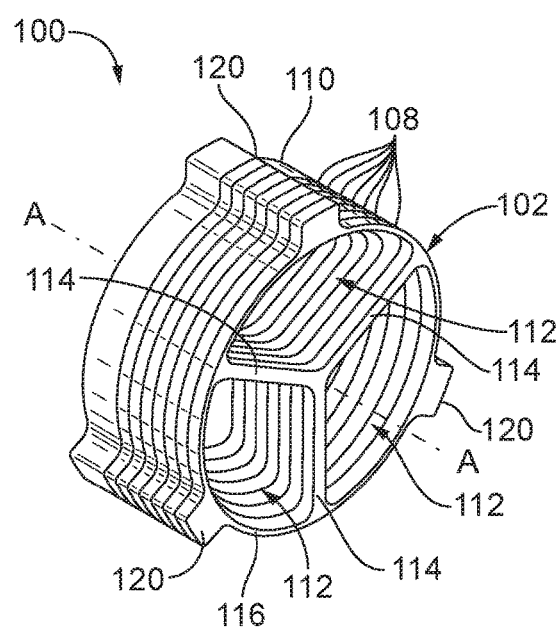
FIG. 2 is a perspective view of the stack of FIG. 1, showing the stack after the blanks have been formed into swirler plates.

Reference will now be made to the drawings wherein like reference numerals identify similar structural features or aspects of the subject disclosure. For purposes of explanation and illustration, and not limitation, a partial view of an exemplary embodiment of a swirler in accordance with the disclosure is shown in FIG. 1 and is designated generally by reference character 100. Other embodiments of swirlers in accordance with the disclosure, or aspects thereof, are provided in FIGS. 2-18, as will be described. The systems and methods described herein can be used to provide swirlers for imparting swirl on a flow of fluid, for example for swirling air in fuel injectors for gas turbine engines.

A method of making a swirler 100 includes starting with a stack 102 of blanks 104. Blanks 104 in this example are identical to one another and are in the shape of cylindrical wafers. An end plate 106 is included, which is thicker in the axial direction of longitudinal axis A than the blanks 104, but otherwise identical in geometry. A cut pattern is indicated in broken lines in FIG. 1. The method includes cutting the blanks 104 and 106 along the pattern indicated in FIG. 1 to form a stack 102 of swirler plates 108 and 110 shown in FIG. 2, where swirler plate 110 is identical to swirler plates 108 except for its axial thickness, corresponding to end plate 106 of FIG. 1. Given the geometry of the swirler plates 108 and 110, it is possible to efficiently perform the cutting with all of the blanks 104 and 106 stacked together so all are cut with a single cutting operation, e.g., simultaneously. This cutting process can employ any suitable process such as electrical discharge machining, water jet machining, conventional cutting (e.g., machining), sheet metal processing (e.g., stamping/cutting/punching), laser cutting, metal injection molding (MIM), additive manufacturing or regular sintering, and/or etching. The cutting operation forms one or more flow passages 112 through the stack 102. Between each circumferentially adjacent pair of flow passages 112 there is a vane portion 114 defined in each swirler plate 108 and 110. Each of the swirler plates 108 and 110 includes a plurality of vane portions 114. Each of the swirler plates 108 and 110 includes a peripheral ring 116, wherein the vane portions 114 of the swirler plates 108 and 110 extend radially inward from the respective peripheral rings 116.

Figure 3:
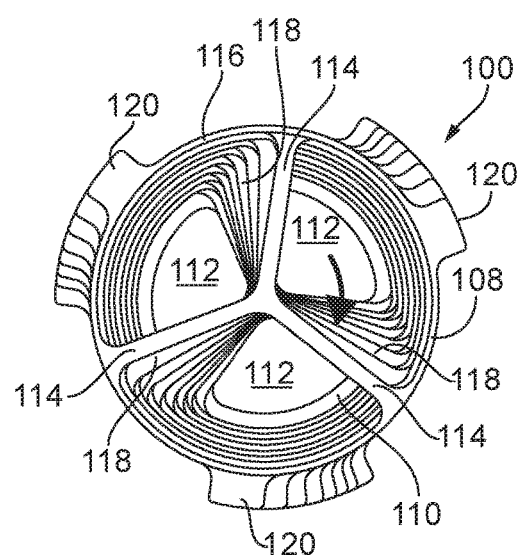
FIG. 3 is an axial end view of the stack of swirler plates of FIG. 2, showing the swirler plates rotated relative to one another to form the vane portions into swirler vanes.

With reference to FIG. 3, the swirler plates 108 and 110 are shown rotated circumferentially about the longitudinal axis A relative to neighboring ones of the swirler plates 108 and 110 so the vane portions 114 form respective swirler vanes 118. Thus when a flow of air or other fluid is conducted through swirl passages 112, swirl will be imparted on the flow by vanes 118.

Figure 4:
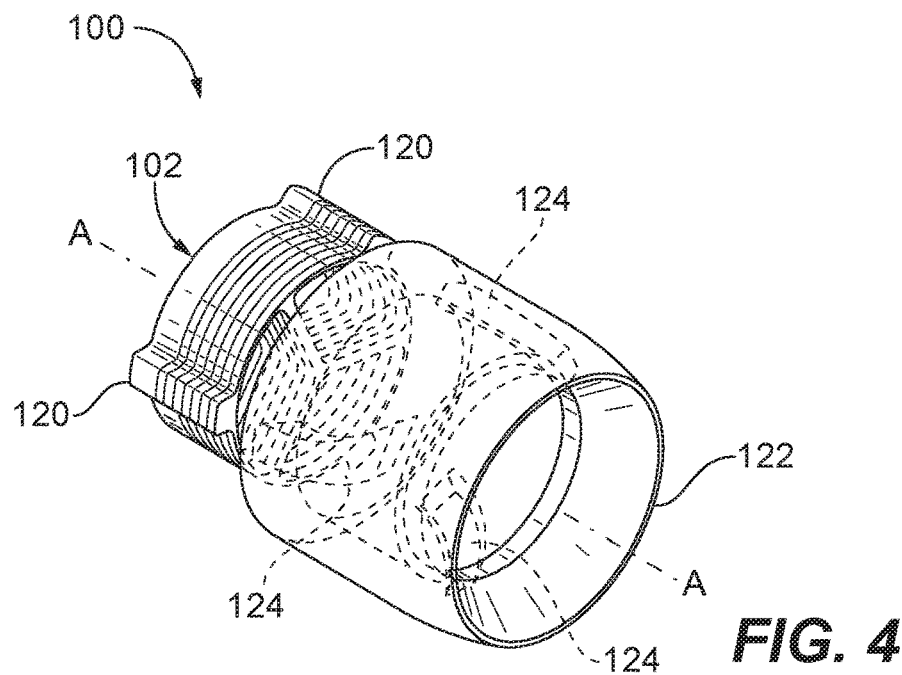
FIG. 4 is an exploded perspective view of the stack of swirler plates of FIG. 2, showing the swirler body with alignment groves for registering the swirler plates into the rotated swirler configuration shown in FIG. 3.

With reference now to FIG. 4, the method includes engaging a stack 102 of swirler plates 108 and 110 with a swirler body 122 defining a longitudinal axis with each swirler plate rotated circumferentially about the longitudinal axis A as described above with reference to FIG. 3. Each swirler plate 108 and 110 includes alignment tongues 120. These alignment tongues engage with respective alignment grooves 124 defined in the swirler body 122 for registration of the swirler plates 108 and 110 to form the swirler vanes as shown in FIG. 3. In other words, alignment grooves 124 are profiled to wind about axis A so that when alignment tongues 120 engage alignment grooves 124, each swirler plate 108 and 110 is rotated circumferentially to the proper position to form swirl vanes 118. Engaging the stack of swirler plates 102 includes sliding the stack of swirler plates into engagement in an axial direction relative to longitudinal axis A, with alignment tongues 120 sliding along alignment grooves 124 of the swirler body. When the stack 102 has reached the end of alignment grooves 124, one or more of the swirler plates 108 and 110 can be joined by any suitable joining process to the swirler body to secure the stack 102 to the swirler body 122. It is also contemplated that the assembly can be done without a tongue/groove structure. This can be done, for example, by aligning the stacked swirler through assembly fixturing, and then joining the swirler together, e.g., through braze. Then the assembly fixture can then be removed. It is also contemplated that the swirler plates 104 can be fused together, e.g., if metallic plates are used they can be heat fused together.

Figure 5:
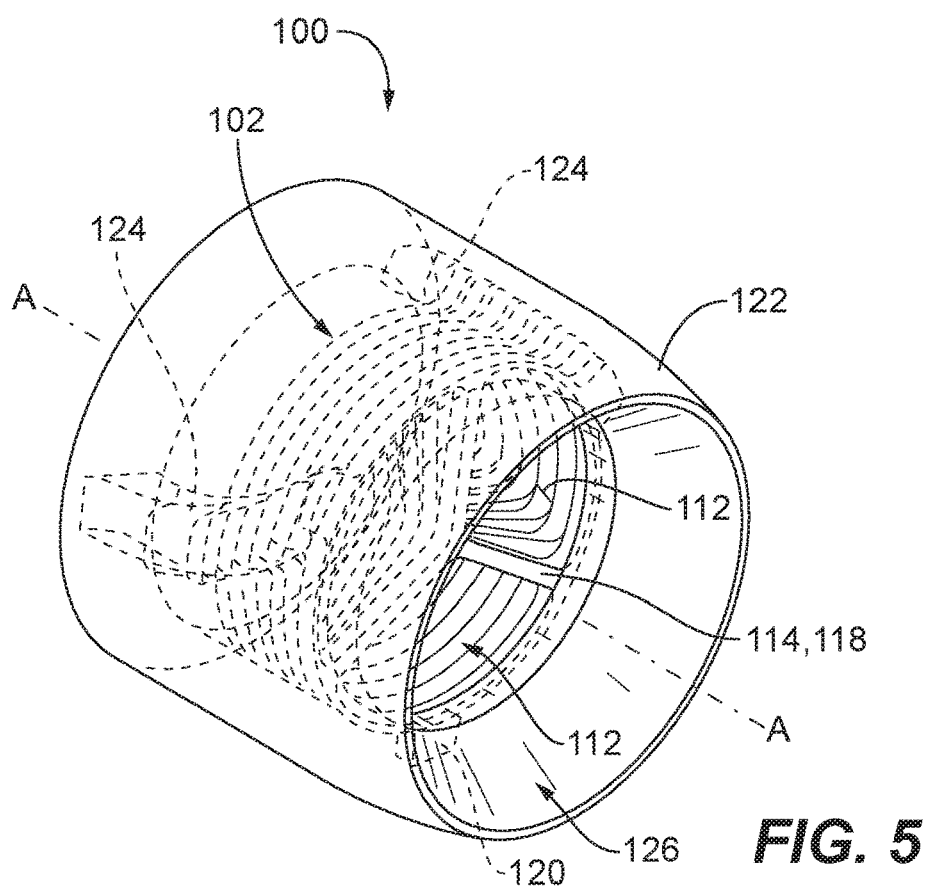
FIG. 5 is a perspective view of the assembled swirler body and swirler plates of FIG. 4, showing the swirler plates registered in position within the swirler body, with the swirler portions of the swirler plates forming swirl vanes.

FIG. 5 shows the stack 102 assembled into swirler body 122 to form swirler 100. The swirler body 122 defines an annular flow passage 126 therethrough. The stack 102 of swirler plates 108 and 118 is mounted within the annular flow passage 126 to impart swirl on fluids flowing through the annular flow passage 126.

The alignment tongue 120 of each swirler plate 108 and 110 is positioned circumferentially relative to the respective vane portions 114 in a circumferential location common to all of the swirler plates 108 and 110, and it is the alignment groves 124 of the swirler body 122 that are profiled to define the swirler vanes 118 by registration of the alignment tongues 120 with the alignment grooves 124. However, those skilled in the art will readily appreciate that any other suitable configuration can be used, for example, if straight alignment grooves were to be used, the circumferential positions of the alignment tongues can vary from plate to plate in the stack to provide the desired vane contour.

Referring now to FIGS. 6-8, another embodiment of a swirler 200 is shown where the swirler plates 210 in stack 202 are not all identical, rather each plate is unique within stack 202. Each swirler plate 210 defines a swirl passage 212 therethrough, and wherein the portion of swirl passage 212 of each successive swirler plate 210 has a reduced size relative to that of a preceding one of the swirler plates in the direction along the longitudinal axis A to define a plurality of converging swirl flow paths 212 through the stack of swirler plates 212. The converging profile of flow passages 212 can be seen in the cross-section of FIG. 7, where the inlets shown in FIG. 6 are larger than the outlets shown in in FIG. 8. In addition to varying the geometry of some or all of the swirler plates of a stack as described herein, it is also contemplated that the materials can be varied from swirler plate to swirler plate within a stack. For example, one or two of the swirler plates 204 (such as the right-most two swirler plates 204 as oriented in FIG. 7) can be made of a heat resistant material such as ceramic, whereas the remaining swirler plates 204 can be made of a less heat tolerant material such as a metal. This way if used in a gas turbine engine, for example, the more heat tolerant swirler plates 204 will provide heat shielding for the less heat tolerant swirler plates 204.

Figure 9:
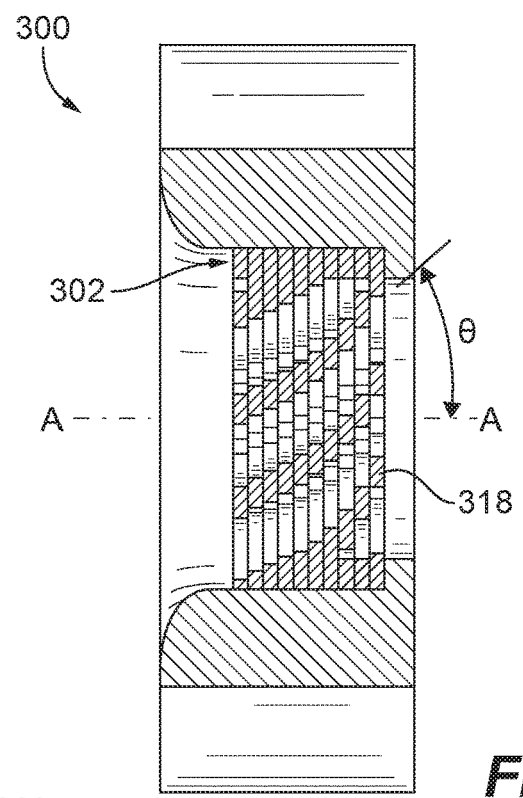
FIGS. 9-10 are partially cut-away side elevation and perspective views, respectively, of another exemplary embodiment of a swirler in accordance with this disclosure, showing a vane angle achieved with the stack of swirler plates that is difficult or impossible to attain with traditional cutting processes.
Figure 10:
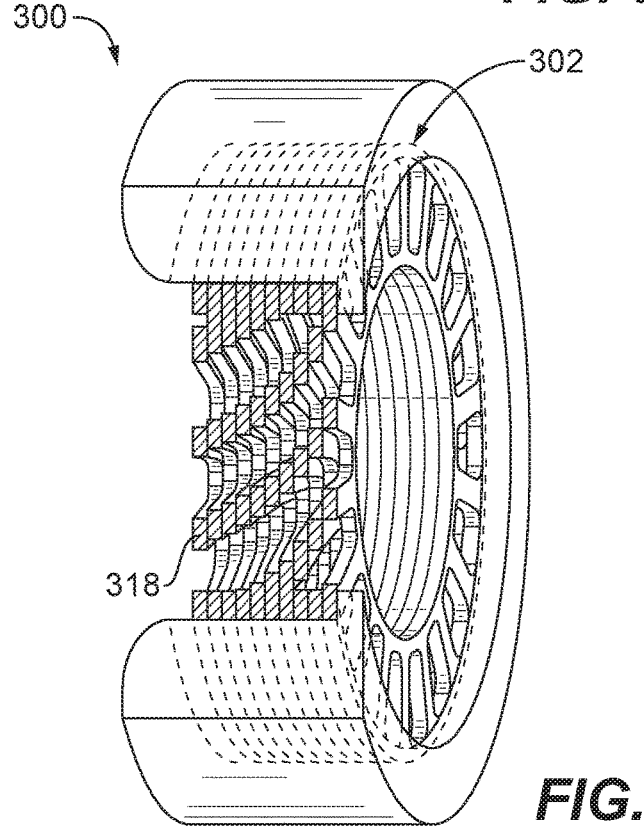

With reference now to FIGS. 9 and 10, using stacks of swirler plates as disclosed herein can provide design freedoms relative to traditional swirler designs. For example, in swirler 300, the stack 302 of swirler plates has vanes 318 with such a high swirl angle θ, e.g., about 75°, and wherein the depth of the vanes 318 is such that at that angle θ, traditional cutting techniques can not be used to form the vanes 318. However, using the stack 302 of swirler plates, such high swirl angles can be achieved by simply providing the circumferential rotation of the swirl plates in stack 302 needed to achieve the desired angle.

With reference now to FIGS. 11-13, any suitable cross-sectional shape can be used for the flow passages. In embodiments described above, swirlers have flow passages where the cross sectional shape of the flow passages is a triangular segment (as shown in FIG. 3) or quadrilateral segment shaped (as shown in FIG. 8). In swirler 400 of FIGS. 11-13, a similar stack of swirler plates is shown to those described above, however the flow passages 418 are cylindrical and the first two plates have an enlargement in the flow passage 418 to provide an entrance that enhances flow through the flow passages 418. The plates are shown as a solid stack prior to relative rotation of the plates, however the plates are shown separately and rotated relative to one another in FIG. 13.

Figure 14:
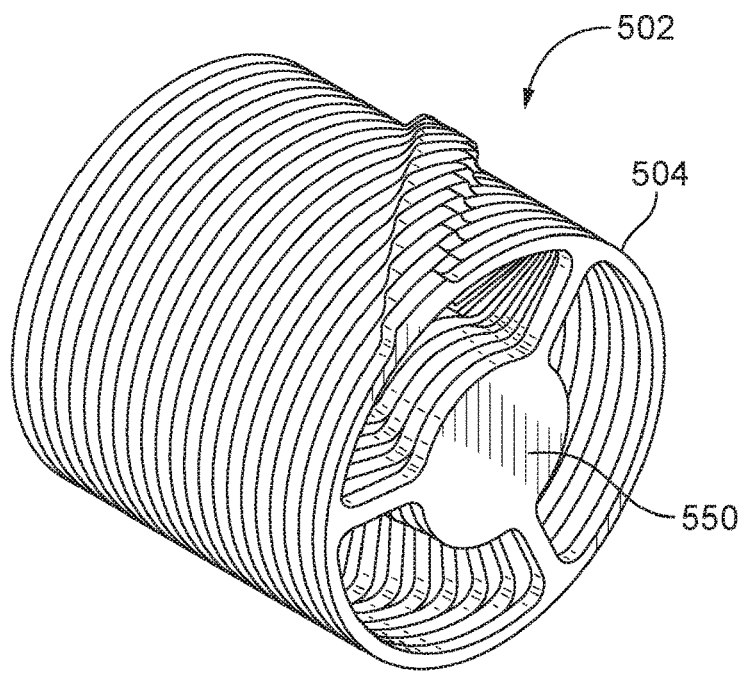
Figure 15:
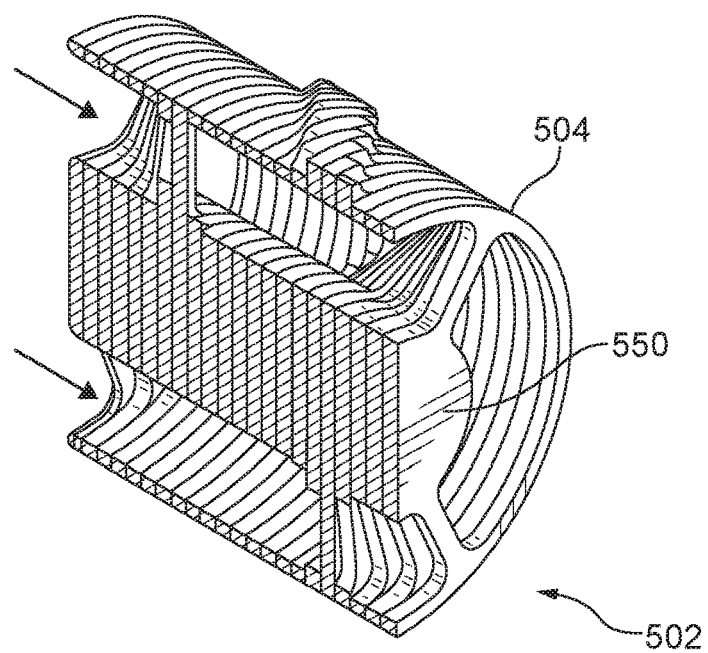
Figure 16:
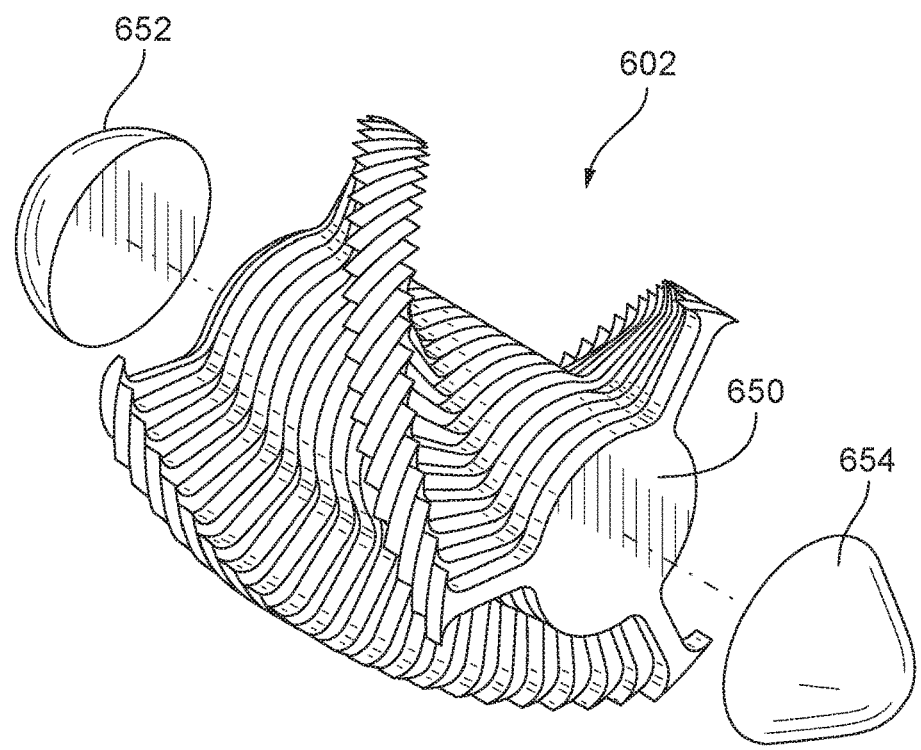
FIGS. 16-17 are exploded perspective and cross-sectional perspective views, respectively, of another exemplary embodiment of a stack of swirler plates in accordance with this disclosure, showing a stack with a central, cylindrical body without peripheral rings, and having optional leading and trailing edge cones.
Figure 17:
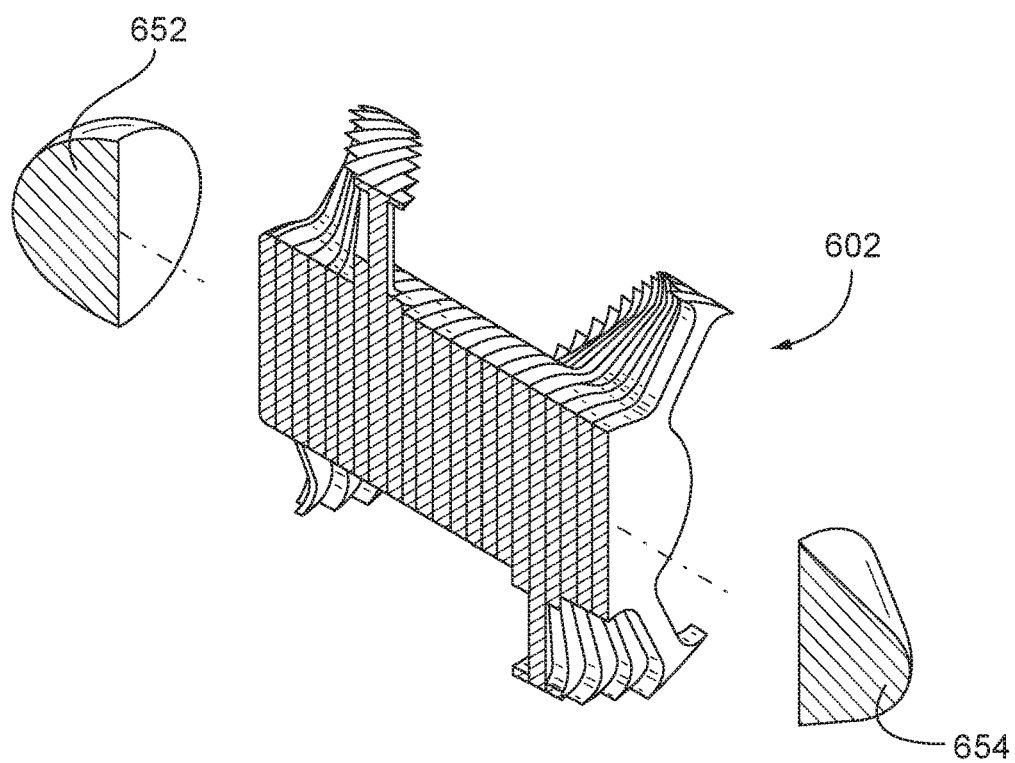

With reference now to FIGS. 14-15, another exemplary embodiment of a stack 502 of swirler plates 504 is shown, similar to those shown in FIG. 3 but with a cylindrical center body 550 included in each swirler plate 504. FIGS. 16-17 show yet another exemplary embodiment of a stack 602 of swirler plates 604 in which the peripheral rings described above are omitted. Additionally, leading and trailing edge cones 652 and 654 can optionally be mounted to center body 650 as needed to provide a given set of flow characteristics.

Figure 18:
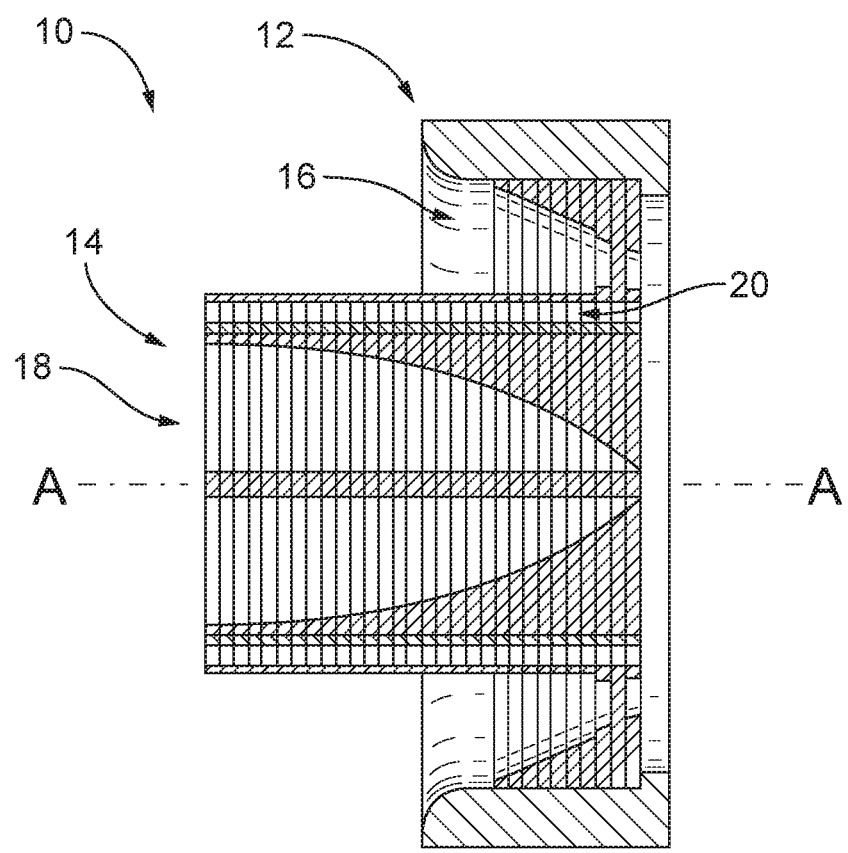
FIG. 18 is a schematic side elevation view of an exemplary nozzle constructed in accordance with the present disclosure, showing inner and outer air swirlers formed using stacks of swirler plates.

With reference now to FIG. 18, a nozzle 10 includes swirlers 12 and 14 as described above, wherein each swirler defines a respective air circuit 16 and 18. The body of nozzle 10 defines a liquid circuit 20 radially between the swirlers 12 and 14. The liquid and air circuits 16, 18, and 20 are configured for air blast atomization of a spray issued form the liquid circuit. This can be used, for example, to atomize fuel for fuel injection in a gas turbine engine. The air circuit 18 inboard of the liquid circuit 20 includes an inner air swirler 14, which can be configured as shown in FIG. 3, 14, or 16, for example. The air circuit 16 outboard of the liquid circuit 20 includes an outer air swirler 12 which can be configured as shown in FIG. 6,10, or 13, for example, where a central aperture accommodates inboard components including the liquid circuit 20 and inner air circuit 18.

Potential advantages of using swirler plates stacked as disclosed herein include ease of manufacturing, wherein multiple plates can be cut in a single operation by cutting an entire stack of plates at once using an EDM or water jet cutting process, or any other suitable process. Ease of assembly is another potential advantage. As described above, there are also potential advantages provided in design flexibility, where geometries not feasible with traditionally technique can be obtained. Another potential advantage is seen through the use of multiple materials where the majority of the plates can be made out of low cost material, while more specialized (but higher cost) materials can be used only where needed (such as flame-facing plates). This allows for an overall lower cost swirler than if it was all required to be made out of special high temperature materials. Additional tailoring of materials to suit opposing design constraints can see further advantages. For instance, perhaps the high oxidizing plates can be used for downstream (e.g., flame facing) surfaces, while upstream surfaces can be made of higher strength (but lower oxidizing) materials can result in a swirler that is heat tolerant where needed but also high strength where also needed.

One further potential advantage may be seen with part commonality to save cost. For example, one set of plates can be made which can be used in a family of air swirlers of varying swirl angle, where the plates are identical (and therefore cheaper due to mass production) and only the alignment groove or alignment fixturing changes between swirlers.

The methods and systems of the present disclosure, as described above and shown in the drawings, provide for swirlers with superior properties including ease of manufacture and geometries difficult or impossible to attain with traditional cutting processes. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A swirler comprising:
a swirler body defining a longitudinal axis; and
a stack of swirler plates assembled to the swirler body stacked in a direction along the longitudinal axis, wherein each of the swirl plates defines a vane portion, and wherein the swirler plates are mounted stationary with respect to the swirler body, and wherein each of the swirler plates is angled circumferentially about the longitudinal axis relative to neighboring ones of the swirler plates so the vane portion forms a swirler vane, wherein the swirler plates are identical to one another and further comprising an end swirler plate at one end of the stack of swirler plates, wherein the end swirler plate includes a swirl vane portion positioned to form part of the swirler vane, wherein the end swirler plate differs from the swirler plates of the stack of swirler plates in at least one of material or axial thickness.

2. The swirler as recited in claim 1, wherein each of the swirler plates includes a plurality of vane portions, and wherein the respective vane portions of the swirler plates form a plurality of respective swirler vanes.

3. The swirler as recited in claim 1, wherein each of the swirler plates includes a peripheral ring, wherein the vane portion of the swirler plates extends radially inward from the respective peripheral ring.

4. The swirler as recited in claim 1, wherein each of the swirler plates includes at least one alignment tongue engaged with an alignment grove defined in the swirler body for registration of the swirler plates to form the swirler vane.

5. The swirler as recited in claim 4, wherein the alignment tongue of each of the swirler plates is positioned circumferentially relative to the respective vane portion in a circumferential location common to all of the swirler plates, and wherein the alignment grove of the swirler body is profiled to define the swirler vane by registration of the at least one alignment tongue with the alignment groove.

6. The swirler as recited in claim 1, wherein the swirler body defines an annular flow passage therethrough, wherein the stack of swirler plates is mounted within the annular flow passage to impart swirl on fluids flowing through the annular flow passage.

* * * * *